United States Patent [19]
Geislinger

[11] 3,789,939
[45] Feb. 5, 1974

[54] APPARATUS FOR PROGRAMMING MOVEMENT OF A CART

[76] Inventor: Eric L. Geislinger, 13773 S.W. Electric St., Beaverton, Oreg. 97005

[22] Filed: Sept. 7, 1971

[21] Appl. No.: 178,116

[52] U.S. Cl.............. 180/6.5, 56/10.2, 56/DIG. 15, 172/3, 180/79.1, 318/162
[51] Int. Cl............................................ B62d 11/04
[58] Field of Search .... 180/6.5, 79.1, 79; 46/244 D; 56/10.2, DIG. 15; 172/3; 318/162, 568, 587

[56] References Cited
UNITED STATES PATENTS

| | | | |
|---|---|---|---|
| 3,061,035 | 10/1962 | King................................... | 180/79.1 |
| 3,582,956 | 6/1971 | Huston et al. .................. | 318/568 X |
| 3,481,417 | 12/1969 | Jarret et al............................ | 180/6.5 |
| 3,650,097 | 3/1972 | Nokes................................... | 56/10.2 |
| 3,072,833 | 1/1963 | Kerr et al............................ | 318/568 |
| 3,340,950 | 9/1967 | Hopengarten................... | 180/105 R |
| 3,356,918 | 12/1967 | Williams.......................... | 318/162 X |
| 3,563,327 | 2/1971 | Mier.................................... | 180/6.5 |

Primary Examiner—Kenneth H. Betts
Assistant Examiner—Leslie J. Paperner
Attorney, Agent, or Firm—Klarquist, Sparkman, Campbell, Leigh, Hall & Whinston

[57] ABSTRACT

A wheeled cart is controlled to take a particular path under the direction of movement information stored on a tape recorder. The information on the tape recorder is initially placed there as the cart is manually directed over the desired path with a control means. The prescribed path for the cart can be altered at any time by changing the recorded information in the same manner as initially provided.

3 Claims, 7 Drawing Figures

PATENTED FEB 5 1974 3,789,939

ERIC L. GEISLINGER
*INVENTOR*

BY
BUCKHORN, BLORE, KLARQUIST & SPARKMAN
*ATTORNEYS*

APPARATUS FOR PROGRAMMING MOVEMENT OF A CART

BACKGROUND OF THE INVENTION

The present invention relates to a programmed cart or vehicle, and particularly to a cart or vehicle which can be easily directed in advance to follow any arbitrary, predetermined path by the user of the vehicle.

Various proposals have been made for guiding a cart or vehicle along a specified route or path, e.g., a tractor moving along a prescribed pathway without manual assistance. Various methods have included the utilization of buried objects in the ground with which the movable cart may align itself, or a mechanical linkage or cam which will cause the apparatus to repeat a given series of movements. Unfortunately, the programming is then not easily alterable or adjustable for individual conditions, and at least involves physical movement of reference elements, or replacing of a cam or similar part.

SUMMARY OF THE INVENTION

According to the present invention, the program of a programmable cart is alterable at will. The program is initially provided by manually directing movement of the cart along a prescribed path, as for instance the desired route of a lawn mower in mowing a yard. Not only are manually directed control instructions applied to the motive means of the cart, but at the same time these instructions are recorded for future use. After the cart has been manually directed through its predetermined course, the same recorded instructions are applicable to the motive means for repeating the same course.

Recorder means are employed which permit change in the prescribed path at will, as by a manually directing cart along another for recording a different path, to which the cart's motive means may then be responsive. For instance, in a preferred embodiment, magnetic tape recorder means are provided whereby any number of different paths may be recorded and/or erased, resulting in optimum flexibility of the cart movement. Also, the present invention allows considerable experimentation or alteration in the paths which may be employed by the cart, i.e., for selecting the path that is the most satisfactory for instance in cutting grass over a particular terrain.

Accordingly, it is an object of the present invention to provide an improved apparatus for programming movement of a cart, allowing maximum flexibility in altering programmed movement to any desired course.

It is another object of the present invention to provide an improved apparatus for programming movement of a cart wherein the programming is accomplished by manually directing the cart over a desired course.

It is a further object of the present invention to provide improved apparatus for programming a cart wherein substantially any number of routes may be programmed for the cart and wherein such routes are changeable at will.

It is further object of the present invention to program movement of a cart wherein the programming may be changed at any time through manual direction of the movement of such cart.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
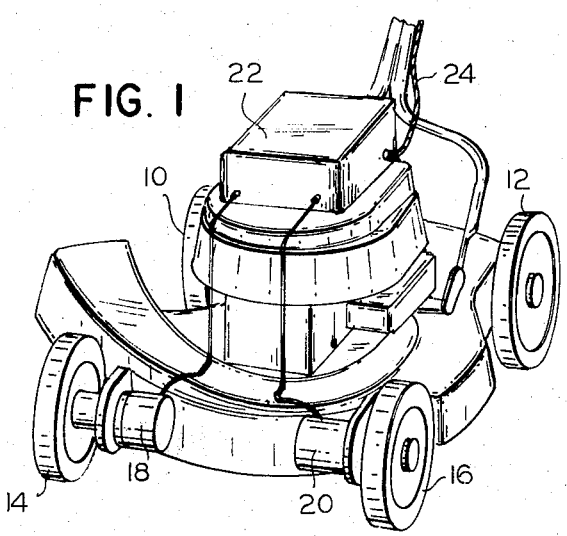
FIG. 1 is a perspective view of a programmable cart, according to the present invention, in the form of a lawn mower.

Referring to the drawings and particularly to FIG. 1, a cart is illustrated in the form of a lawn mower of the rotary type having the rear wheels 10 and 12 and front wheels 14 and 16. In this case the front wheels are motor driven by means of electric motors 18 and 20, respectively, but it is understood the motors may alternatively drive the rear wheels rather than the front wheels. The motors are controlled and empowered from cabinet 22 which may include a motor power supply. Control leads 24 are connected between cabinet 22 and further control devices in the form of one or more potentiometers, as hereinafter more fully described, adapted for mounting upon the upper handle of the lawn mower (not shown). While a lawn mower is illustrated for purposes of explaining the invention, it is understood that the cart may equally well comprise a vacuum cleaner, floor polisher, toy or other similar vehicle which is movable upon wheels.

Figure 2:
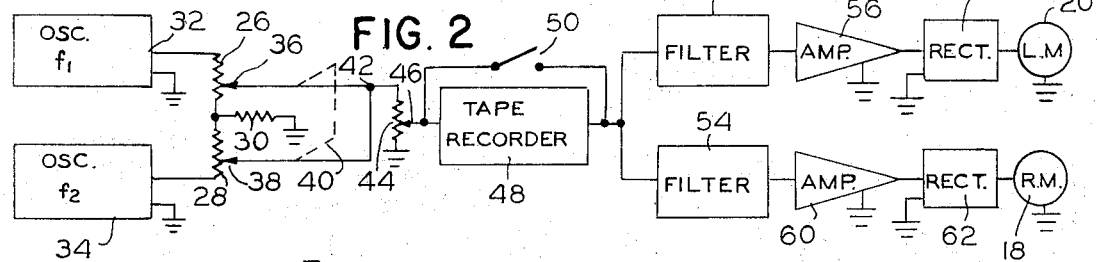
FIG. 2 is a block diagram of a first circuit embodiment of the apparatus according to the present invention for programming movement of a cart.

Referring to FIG. 2 illustrating a preferred embodiment of the present invention, the aforementioned potentiometers for mounting upon the lawn mower upper handle are illustrated at 26 and 28, respectively, and each comprises a voltage divider together with grounded resistor 30 connected to a center tap between potentiometers 26 and 28. The remaining end of the potentiometer 26 is coupled to the output of oscillator 32 while the remaining terminal of potentiometer 28 is connected to the output of oscillator 34. Oscillators 32 and 34 are of conventional construction and provide outputs at frequencies $f_1$ and $f_2$, respectively. In a typical instance, these frequencies are suitably 600 Hertz and 1,000 Hertz.

As illustrated in FIG. 2, the potentiometers' movable taps 36 and 38 are controllable together by a single handle indicated by dashed line 40. The arrangement is such that simultaneous movement of potentiometer taps in a first direction, i.e., upwardly on the drawing, increases the output of oscillator 32 at tap 36 while decreasing the output of oscillator 34 at tap 38. The reverse movement produces the reverse result. The taps are connected together at terminal 42 at the top of a further potentiometer 44, which is also mounted on the lawn mower upper handle and connected via control leads 24 in FIG. 1. The oscillator outputs are thus combined and the combined signal is adjusted in amplitude by means of the movable tap 46 of potentiometer 44. The movable tap 46 of potentiometer 44 is employed principally to control the over-all speed of the cart, while the handle indicated at 40 is to control its direction of movement.

The movable tap 46 is connected to the recording input of a tape recorder 48, and also via switch 50 to the playback output of tape recorder 48, as well as to the inputs of filters 52 and 54. Filters 52 and 54 are tuned to the frequencies $f_1$ and $f_2$, respectively, i.e., these filters comprise resonant or bandpass filters for specifically detecting these frequencies. Preferably, these filters comprise active filters as hereinafter more fully described. The output of filter 52 drives power amplifier 56 which provides the power for left motor 20 through rectifier 58. Similarly, amplifier 60 provides the power for right motor 18 via rectifier 62. It is understood that amplifiers 56 and 60 comprise power amplifiers sufficiently empowered and of sufficient output for driving the motors 20 and 18. The amplifier outputs, being AC, are rectified by rectifiers 58 and 62 before application to the motors 20 and 18 which are suitable DC motors. Alternatively, the output of amplifiers 56 and 60 may be employed in a well known manner to control the application of direct current power from another source to the motors 20 and 18.

Recorder 48 is suitably a commercially available cassette type tape recorder or the like, employing magnetic tape as a recording medium. It is understood the recorder has a conventional "record" input and a "playback" output, and conventional means for switching between the "record" and "playback" functions.

Considering operation of the FIG. 2 circuit, the cart is first operated manually over a predetermined path by controlling potentiometer movable taps 36 and 38. The tape recorder is set to a record mode at this time and switch 50 is suitably closed whereby the combined output at terminal 42 is recorded on recorder 48 while it is also coupled to filters 52 and 54. As the potentiometer taps 36 and 38 are moved upwardly by the common handle indicated at 40, the amplitude of the oscillator signal component of frequency $f_1$ will increase at terminal 42, while the amplitude of the signal component at frequency $f_2$ will decrease. Since filter 52 is attuned to frequency $f_1$, a greater amplitude signal at that frequency will provide a larger drive to left motor 20 via amplifier 56 than is provided at frequency $f_2$ via filter 54 and amplifier 60 to motor 19. Consequently, the cart moves forwardly, but motor 20 turns more rapidly than motor 18, causing the cart to turn to the right. If, on the other hand, the taps 36 and 38 are moved downwardly by the handle indicated at 40, right motor 18 will receive the greater input, and the cart will turn to the left. With taps 36 and 38 both at midscale, the cart will move directly ahead.

Alternatively, potentiometers 26 and 28 can be so designed, i.e., in taper, so that the center position of each potentiometer supplies a maximum output at terminal 42. Then, rotation of the potentiometers by means of the handle indicated at 40 functions only to slow down one of the motors while the speed of the other motor remains substantially constant.

While the cart is thus directed over any desired path by means of the common control handle indicated at 40, the same signals are recorded on the magnetic tape medium of recorder 48. When the desired path for the cart is completed, recorder 48 may be turned off and the tape may be rewound in the conventional manner to its starting position. Thereupon, switch 50 is opened and the tape recorder is switched to the playback mode. The tape recorder will now provide the identical combination signal to filters 52 and 54 which was theretofore delivered at terminal 42. Consequently, the cart will follow the original predetermined movements directed by the initial operation of the control handle as the cart was first moved over such path.

Thus, if the cart is a lawn mower as illustrated in FIG. 1, the lawn mower may be first directed over the desired path by employing the control handle indicated at 40 with the tape recorder switched to the record mode. When the path is complete, the recorder is switched off. At a later time, when it is desired that the lawn mower follow the original recorded path for cutting the same lawn, the mower is placed at the same starting position pointing in the same direction, and the tape recorder 48 is operated in the playback mode. The mower will then follow this recorded path. At the end of the recording, the oscillator signals will no longer be present at the output of the recorder, and the machine will stop.

The present invention is quite flexible in that the cart may be reprogrammed at any time to follow a different path. Thus, if it is desired to change the path which the cart takes, it is only necessary to rewind the tape, switch recorder 48 to record, and guide the cart by means of the handle indicated at 40 over a different path. Switch 50 is closed at this time. The new path information will be recorded in place of the old on the tape recorder. Then the cart is ready to repeat the newly recorded path in the same manner as indicated above. Alternatively, more than one path may be recorded on the same tape as desired, with a nonrecorded length of tape being left between information relating to different paths such that the cart will stop at the end of the desired path. The particular path of movement is then selected by selection of the proper recorded location on the tape, and, of course, may be changed at any time partially or completely by rewriting the magnetic tape with the potentiometer control as hereinbefore mentioned.

It is apparent that with the usual tape recorder, e.g., with a cassette recorder, an individual tape is easily removed and replaced with a separate tape. Thus, the cart is made adaptable for operating over many alternative paths recorded at different times. Furthermore, a tape recorder may be employed with an adjustable amplitude output and with speed controls for adjusting the speed of tape transport. In such instance, the cart may be moved ovrer a given path relatively slowly by hand, after which the tape recorder playback tape speed and signal output amplitude is adjusted for causing the cart to move over the desired path at a greater speed.

Figure 3:
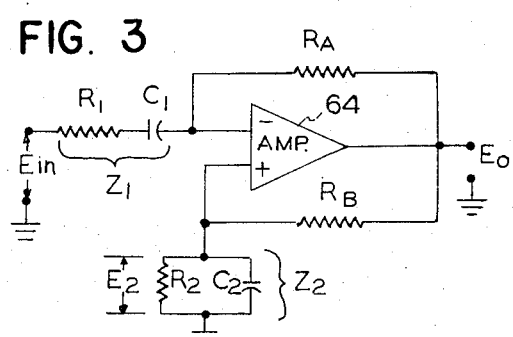
FIG. 3 is a more detailed schematic diagram of a portion of the FIG. 2 circuit.

Although passive filter networks may be employed for filters 52 and 54, active filters are to be preferred because of the higher "Q" which can be attained therewith. Referring to FIG. 3, illustrating such a filter, the circuit includes an amplifier 64 having "plus" and "minus" differential inputs, and a common "output" connected to the terminal designated $E_o$. The circuit is connected in operational amplifier fashion and includes a first feedback resistor $R_A$ connected between the output and the negative or inverting input. An input impedance $Z_1$ is connected between the input filter terminal where the input $E_{in}$ is applied and the negative amplifier terminal. This impedance $Z_1$ comprises an RC circuit including a series connected resistor $R_1$ and capacitor $C_1$.

A second feedback resistor $R_B$ is connected between the amplifier output and the positive or non-inverting input of amplifier 64. Moreover, a shunt impedance $Z_2$ is disposed between the positive input of the amplifier and ground. This shunt impedance comprises an RC circuit including the parallel combination of resistor $R_2$ and capacitor $C_2$. The voltage across the combination is $E_2$ which, in this particular instance, is employed as the actual output of the filter for application to amplifiers 56 or 60.

It can be shown that the filter circuit transfer function $T(s) = E_2/E_{in} = - [Z_2/(Z_1/K) - Z_2]$, where $K = R_A/R_B$.

If $Z_1$ and $Z_2$ are chosen to be as indicated in FIG. 3, i.e., the series and parallel combinations of resistance and capacitance as shown, and if the resistors are respectively made equal to the same value $R$, while the capacitors are made equal to the same value, $C$, then $$T(s) = [-K\omega_o s/s^2 + \omega_o(2-K)s + \omega_o^2], \text{ wherein } 1/RC = \omega_o.$$

Figure 4:
FIG. 4 is a schematic diagram of an alternative portion of the FIG. 2 circuit.

This equation is the same form as the transfer function between the output and the input voltage of an R-L-C circuit, such as illustrated in FIG. 4 (but further including a load resistor). In other words, the transfer function is substantially the same as that of a resonant circuit with a center frequency, $\omega_o = 1/RC$. In a less preferred circuit form, the filters 52 and 54 may each comprise the series resonant circuit of FIG. 4 including respective inductances 66 and capacitors 68, tuned, of course, to the respective frequencies $f_1$ and $f_2$.

Figure 5:
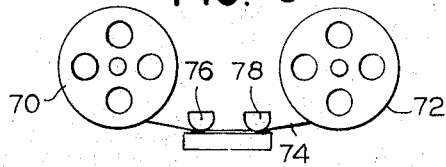
FIG. 5 is a partial plan view of a preferred recorder apparatus according to the present invention.

An alternative embodiment will be considered with the aid of FIG. 5, illustrating a portion of a magnetic tape recorder such as referred to at 48 in FIG. 2. This tape recorder includes tape reels 70 and 72 which alternately form payout and takeup reels for magnetic tape medium 74. During recording and playback the tape moves from reel 70 onto reel 72. In the FIG. 5 embodiment, a "write" head 76 is utilized in the conventional manner for recording information on the tape and is accordingly connected by circuit means within the tape recorder 48 to the movable tap 46 in FIG. 2. Magnetic "read" head 78 provides the output of the tape recorder through circuit means within recorder 48 in FIG. 2 for application to the inputs of filters 52 and 54. Head 78 may also be termed a monitor head. This arrangement replaces the conventional tape recorder arrangement where the same head is employed for both reading and writing, that is to say, recording and playing back. In utilizing the embodiment of FIG. 5, the switch 50 in FIG. 2 is eliminated together with the connections thereto from the recorder input and output. The read head 78 drives playback circuitry within the recorder 48 at all times, and an output is always produced for application to filters 52 and 54. Thus, when the cart is under the control of the handle indicated at 40, a direct connection is not required to the filters 52 and 54 via switch 50, but rather the input directive information is recorded on tape 74 in FIG. 5 and immediately read by read head 78.

When the cart is controlled by the handle indicated at 40, the combined signal at terminal 42 is transcribed on the tape by "write" head 76. Then a short time later, determined by the time required for the tape to pass between heads 76 and 78, an output is produced from read head 78 for operating motors 20 and 18 via the filter and amplifier circuitry. Although a slight delay thus occurs in the control of the cart, this mode of operation eliminates the possibility of the recorder failing faithfully to reproduce the original path. Thus, when the control signals from terminal 42 are at all times passed through the recorder, even for producing the original movements of the cart, such movements will be faithfully and accurately reproduced at a subsequent time. This arrangement thus adapts the invention for use employing tape recorders which do not necessarily have linear recording and reproduction characteristics.

Figure 6:
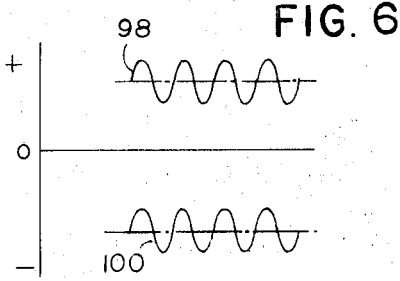
FIG. 6 is a waveform chart illustrating operation according to an alternative embodiment of the present invention.
Figure 7:
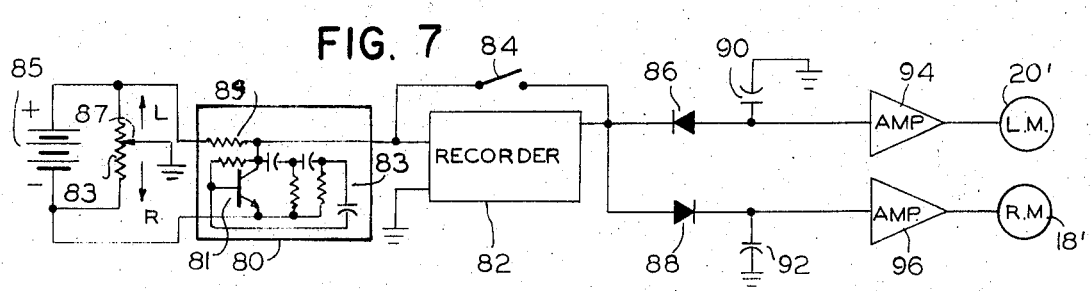
FIG. 7 is a block diagram of an alternative circuit embodiment of apparatus according to the present invention for programming movement of a cart.

Another embodiment according to the present invention is illustrated in block diagram form in FIG. 7. In this case, a single oscillator 80 is provided which supplies an output at a predetermined audio frequency, and such oscillator may conveniently comprise a transistor or vacuum tube phase shift oscillator. For instance, the oscillator illustrated includes a transistor 81 provided with a feedback phase shift network 83. The power supply for the oscillator comprises a battery 85 shunted by potentiometer 83 having a movable tap 87 which is grounded. It is understood that potentiometer 83 is conveniently mounted for controlling movement of the cart, as by placing the same on the upper handle in case of a lawn mower embodiment. The battery 85 empowers the active element such as the transistor 81 of the oscillator 80 in the usual manner via load resistor 89, but the oscillator circuitry is not returned to ground at a point other than the movable tap 84 of potentiometer 82. Referring to the waveform chart of FIG. 6, showing two example outputs of the oscillator, the sine wave 98 illustrates the oscillator output derived at the output terminal of the oscillator's active element, e.g., the collector of transistor 81, when the center tap 87 is moved towards the negative terminal of battery 85. Under such circumstances, the DC level of the oscillator output will be relatively positive with respect to ground since the negative terminal of battery 85 is close to ground. On the other hand, if the movable terminal 87 is moved upwardly toward the positive terminal of battery 85, the oscillator output will be relatively negatively biased as illustrated by waveform 100 in FIG. 6.

In the embodiment of FIG. 7, the output of oscillator 80 is coupled to recorder 82 and via switch 84 (when closed) to the playback output of recorder 82. Recorder 82 may comprise a conventional cassette tape recorder, but must be direct coupled and adapted for transcribing not only the oscillatory output of oscillator 80, but also the DC level thereof. The playback output of recorder 82 is coupled via oppositely poled diodes 86 and 88 to the inputs of direct coupled amplifiers 94 and 96, respectively. Amplifiers 94 and 96 drive left DC motor 20' and right DC motor 18', corresponding to the motors 18 and 20 in the previous embodiment. Diode 86 is connected with its anode coupled to the input of amplifier 94, while diode 88 has its cathode coupled to the input of amplifier 96. The input of amplifier 94 is shunted to ground by means of capacitor 90, while the input of amplifier 96 is similarly shunted to ground by capacitor 92. It should be noted in passing that the recorder 48 in FIG. 2 need not be direct coupled, and neither do amplifiers 56 and 60 have to be direct coupled.

Considering operation of the FIG. 7 circuit, if switch 84 is closed and potentiometer movable tap 87 is moved downwardly towards the negative terminal of battery 85, for producing an output similar to waveform 98 in FIG. 6, the diode 88 will conduct due to the positively biased signal. Capacitor 92 smooths the AC content of the waveform, providing an average level thereof which is amplified by amplifier 96 and applied to right motor 18'. Consequently, an output for amplifier 96 is present whereby right motor 18' will rotate causing the cart to turn to the left. If, on the other hand, the potentiometer tap 87 is moved upwardly causing the oscillator 80 to produce a waveform similar to that indicated at 100 in FIG. 6, diode 86 will couple the signal via amplifier 94 to left motor 20' causing the cart to turn in a right-hand direction. At the same time, the same information is recorded on recorder 82. In the case of the FIG. 7 embodiment when the movable tap 84 is located at mid-range, both rectifiers 86 and 88 will produce a half wave rectified output stored temporarily on capacitors 90 and 92 for causing the cart to move straight ahead through energization of both motors 18' and 20'. The same information may be played back at a subsequent time with switch 84 open and with the recorder switched to the usual playback mode. As in the previous embodiment, the information in the recorder may be altered at any time by running the cart over a different path by means of movable tap 84, and the cart is then programmed to follow this different path.

In the case of the FIG. 7 embodiment, it is understood that amplifiers 94 and 96 have a low enough resistance input to provide for slow discharge of capacitors 90 and 92. The inputs of amplifiers 94 and 96 tend to follow the level of the oscillator output, i.e., the bias thereof, without being sensitive to the individual oscillator output cycles.

While only two oscillators are illustrated in the case of the FIG. 2 preferred embodiment, it is appreciated that other oscillators can be similarly coupled to terminal 42, and other filter and amplifier circuits coupled to the output of tape recorder 48 for performing various other functions such as initiating rewind of the tape, transferring control to another tape recorder, turning the equipment on or off, etc.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

What is claimed is:

1. Apparatus for programming movement of a cart, said apparatus comprising,
    motive means for said cart coupled to wheels thereof for determining the direction of movement thereof,
    control means for selectively controlling said motive means for determining the movement of said cart in a path arbitrarily selected by said control means,
    first and second oscillator circuits providing first and second outputs wherein said control means effects comparative amplitudes of the outputs of said first and second oscillator circuits to which said motive means are responsive for effecting a change in direction of movement of the cart in accordance with the relative outputs of said oscillator circuits,
    a recorder means provided with a magnetic recording medium adaptable for continuously recording information provided by the outputs of said first and second oscillator means according to said comparative amplitudes of the outputs of said first and second oscillator circuits during operation of said cart as said cart moves in said path for establishing a recording on the magnetic recording medium representative of such path,
    wherein the outputs of the first and second oscillator circuits are added before recording, and wherein said control means further includes means for regulating the total amplitude of the added signal for controlling the speed of said cart, and means for coupling an output of said recorder means to said motive means so that said motive means is alternatively controllable by said recording medium for subsequently operating said motive means to control the direction of said cart for substantially duplicating the path previously taken.

2. Apparatus for programming movement of a cart, said apparatus comprising:
    motive means for said cart coupled to wheels thereof for determining the direction of movement thereof,
    control means for selectively controlling said motive means for determining the movement of said cart in a path arbitrarily selected by said control means,
    first and second oscillator circuits providing first and second outputs wherein said control means effects comparative amplitudes of the outputs of said first and second oscillator circuits to which said motive means are responsive for effecting a change in direction of movement of the cart in accordance with the relative outputs of said oscillator circuits,
    a recorder means provided with a magnetic recording medium adapted for continuously recording information provided according to said comparative amplitudes of the outputs of said first and second oscillator circuits during operation of said cart as said cart moves in said path for establishing a recording on the magnetic recording medium representative of such path,
    wherein the outputs of the first and second oscillator circuits are added before recording,
    and means for coupling an ouput of said recorder means to said motive means so that said motive means is alternatively controllable by said recording medium for subsequently operating said motive means to control the direction of said cart for substantially duplicating the path previously taken.

3. Apparatus for programming movement of a wheeled cart, said apparatus comprising:
    motive means for said cart coupled to the wheels thereof by means of which movement of said cart is determined, including propulsion of said cart in a generally forward direction, said motive means comprising first and second motor means coupled to drive respective wheels of said cart, a recorder means having a recording medium for bearing movement information representative of the course of movement for said cart, means for coupling said recorder means to said motive means for causing said cart to follow a predetermined path in accordance with said information, manually operable control means for selectively providing electric control values, said motive means being selectively responsive to said electrical control values for directing a different path of movement for said cart, including first and second oscillator circuits providing first and second outputs wherein said control means effects comparative amplitudes of the outputs of said first and second oscillator circuits, means for at the same time coupling said control means to said recorder means for recording movement information representative of said different path on the recording medium in the recorder to which said cart can be subsequently responsive, said outputs of said first and second oscillator circuits providing the recording of information in said recorder means, and means in circuit with said first and second motor means responsive to the frequencies respectively of said first and second oscillators for determining movement of said first and second motor means, wherein said frequency responsive means each comprise an active filter circuit including an operational amplifier having a pair of differential inputs and a pair of feedback impedances coupled respectively thereto, a first RC series circuit for coupling a filter circuit input to an inverting input of said amplifier, and a parallel RC circuit coupled to a non-inverting input of said amplifier and across which the filtered output is taken.

* * * * *

UNITED STATES PATENT OFFICE
CERTIFICATE OF CORRECTION

Patent No. 3,789,939　　　　　　　　Dated February 5, 1974

Inventor(s) Eric L. Geislinger

It is certified that error appears in the above-identified patent and that said Letters Patent are hereby corrected as shown below:

Column 3, lines 29-30, "suitable" should be --suitably--.

Column 3, line 56, "motor 19" should be --motor 18--.

Column 4, line 59, "ovrer" should be --over--.

Column 8, line 45 (claim 2, line 16), "adapted" should be --adaptable--.

Signed and sealed this 17th day of September 1974.

(SEAL)
Attest:

McCOY M. GIBSON JR.
Attesting Officer

C. MARSHALL DANN
Commissioner of Patents